United States Patent
Minamisako

(10) Patent No.: US 10,551,074 B2
(45) Date of Patent: Feb. 4, 2020

(54) HEATING AND HOT WATER SUPPLY SYSTEM

(71) Applicant: Mitsubishi Electric Corporation, Tokyo (JP)

(72) Inventor: Hirokazu Minamisako, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1307 days.

(21) Appl. No.: 14/338,468

(22) Filed: Jul. 23, 2014

(65) Prior Publication Data

US 2015/0034730 A1 Feb. 5, 2015

(30) Foreign Application Priority Data

Aug. 2, 2013 (JP) .................................. 2013-161289

(51) Int. Cl.
*F24D 19/10* (2006.01)
*F24D 3/08* (2006.01)
(Continued)

(52) U.S. Cl.
CPC ......... *F24D 19/1072* (2013.01); *F24D 3/082* (2013.01); *F24D 3/105* (2013.01);
(Continued)

(58) Field of Classification Search
CPC ............. F24D 19/1066; F24D 19/1072; F24D 19/1021; F24D 19/1024; F24D 19/1039; F24D 3/105; F24D 3/18; F24D 2220/0242
(Continued)

(56) References Cited

U.S. PATENT DOCUMENTS 4,269,263 A * 5/1981 Yukimachi .......... F24D 11/0264
                                                            165/240
7,021,372 B2 * 4/2006 Pickard ................... F24D 3/141
                                                            165/168
(Continued)

FOREIGN PATENT DOCUMENTS

DE     201 02 610 U1    6/2001
EP     2 249 098 A1    11/2010
(Continued)

OTHER PUBLICATIONS

Office Action dated Jul. 13, 2016 issued in corresponding CN patent application No. 201410377599.0 (and partial English translation).
(Continued)

*Primary Examiner* — Steven B McAllister
*Assistant Examiner* — Daniel E Namay
(74) *Attorney, Agent, or Firm* — Posz Law Group, PLC

(57) ABSTRACT

The system includes: a heat pump unit; a hot water supply heat exchanger; heating heat exchangers; a pump; heat medium pipes that connect a discharge side of the pump, the heat pump unit, the hot water supply heat exchanger, the heating heat exchangers, and a suction side of the pump in order; a first bypass pipe that bypasses the hot water supply heat exchanger from the heat medium pipe; a second bypass pipe that bypasses the heating heat exchangers from the heat medium pipe; a four-way valve that regulates flow distribution of the heat medium between the hot water supply heat exchanger and the first bypass pipe 22, and between the heating heat exchangers and the second bypass pipe; and a control unit for controlling the four-way valve in accordance with a hot water supply request and a heating request.

5 Claims, 3 Drawing Sheets

(51) Int. Cl.
*F24D 3/10* (2006.01)
*F24D 3/18* (2006.01)

(52) U.S. Cl.
CPC ..... *F24D 19/1021* (2013.01); *F24D 19/1024* (2013.01); *F24D 19/1039* (2013.01); *F24D 3/18* (2013.01); *F24D 2220/0242* (2013.01); *Y02B 30/12* (2013.01)

(58) Field of Classification Search
USPC .................................................. 237/2 B, 69
See application file for complete search history.

(56) References Cited

U.S. PATENT DOCUMENTS

| | | | | |
|---|---|---|---|---|
| 7,992,623 | B2* | 8/2011 | Keller | F24D 3/127 165/49 |
| 8,025,240 | B2* | 9/2011 | Keller | F24D 3/127 165/47 |
| 8,028,742 | B2* | 10/2011 | Fiedrich | F24D 3/142 165/49 |
| 8,132,422 | B2* | 3/2012 | Kamiya | F02G 5/04 62/238.6 |
| 8,245,948 | B2* | 8/2012 | Cho | F25B 27/02 122/1 R |
| 8,322,092 | B2* | 12/2012 | Isaacs | F24D 3/005 165/10 |
| 8,595,998 | B2* | 12/2013 | Isaacs | F24J 3/082 165/10 |
| 8,875,459 | B2* | 11/2014 | Palmeri | E04B 2/7407 52/274 |
| 9,003,818 | B2* | 4/2015 | Choi | F24D 3/18 62/173 |
| 2009/0001185 | A1* | 1/2009 | Kroll | F24D 3/14 237/60 |
| 2009/0320503 | A1* | 12/2009 | Kamiya | F02G 5/04 62/79 |
| 2010/0025488 | A1* | 2/2010 | Park | F24D 3/08 237/2 B |
| 2010/0051713 | A1* | 3/2010 | Back | F24D 11/0214 237/2 B |
| 2010/0195991 | A1* | 8/2010 | Deivasigamani | F24D 17/0026 392/308 |
| 2011/0011943 | A1* | 1/2011 | Aspeslagh | F24D 3/18 237/2 B |
| 2011/0016897 | A1* | 1/2011 | Akagi | F24D 3/18 62/161 |
| 2011/0016898 | A1* | 1/2011 | Ghesquiere | F24D 3/18 62/238.7 |
| 2011/0041781 | A1* | 2/2011 | Deivasigamani | F24H 1/186 122/18.1 |
| 2011/0072840 | A1* | 3/2011 | Itagaki | F24D 3/18 62/222 |
| 2011/0259025 | A1* | 10/2011 | Noh | F24D 3/08 62/160 |
| 2011/0259027 | A1* | 10/2011 | Choi | F24D 3/18 62/196.1 |
| 2012/0043390 | A1* | 2/2012 | Noh | F24D 3/08 237/2 A |
| 2014/0026602 | A1* | 1/2014 | Yabase | F25B 15/00 62/101 |
| 2015/0159914 | A1* | 6/2015 | Dennis | F24D 11/003 126/714 |
| 2015/0253020 | A1* | 9/2015 | Honda | F25B 13/00 62/190 |
| 2017/0248039 | A1* | 8/2017 | Aumann | F01K 17/02 |

FOREIGN PATENT DOCUMENTS

| | | | | |
|---|---|---|---|---|
| JP | 60240934 | A * | 11/1985 | ............... F24D 3/18 |
| JP | 61122428 | A * | 6/1986 | ............... F24D 3/18 |
| JP | 2010-008036 | A | 1/2010 | |
| JP | 2010-060270 | A | 3/2010 | |
| WO | 2013/093246 | A1 | 6/2013 | |

OTHER PUBLICATIONS

Office Action dated Oct. 21, 2015 in corresponding EP application No. 14179030.3.
Extended European Search Report dated Dec. 4, 2014 in corresponding EP application No. 14179030.3.

* cited by examiner

# HEATING AND HOT WATER SUPPLY SYSTEM

BACKGROUND OF THE INVENTION

Field of the Invention

The present invention relates to a heating and hot water supply system, and more particularly to a heating and hot water supply system that performs hot water supply and heating using hot water heated by a heat pump as a medium.

Background Art

Conventionally, for example, Japanese Patent Laid-Open No. 2010-60270 discloses a heating and hot water supply system including a heating system that circulates hot water heated by a heating mechanism to a heating terminal to achieve a heating function, and a hot water supply system that circulates hot water heated by the heating mechanism to a heat exchanger in a hot water storage tank. Specifically, in the heating and hot water supply system, a circuit for circulating hot water heated by a heat pump unit to the heating terminal, and a circuit that circulates hot water to the heat exchanger in the hot water storage tank while bypassing the heating terminal are provided, and a three-way valve provided at a junction of the circuits is switched to select either of the circuits, thereby using the heating system and the hot water supply system for each purpose.

CITATION LIST

Patent Literature 1: Japanese Patent Laid-Open No. 2010-60270
Patent Literature 2: Japanese Patent Laid-Open No. 2010-8036

SUMMARY OF THE INVENTION

Technical Problem

However, in the conventional heating and hot water supply system, the circuit that circulates hot water to the heating terminal and the circuit that circulates hot water to the heat exchanger in the hot water storage tank are switched to achieve each function. Thus, a hot water supply function and a heating function cannot be simultaneously achieved, thereby reducing room temperature during hot water supply and reducing comfort.

The present invention is achieved to solve the above described problem, and has an object to provide a heating and hot water supply system capable of simultaneously achieving a hot water supply request and a heating request.

Means for Solving the Problems

According to the present invention, there is provided a heating and hot water supply system comprising:
heating means for heating a heat medium;
a hot water supply heat exchanger that performs heat exchange between the heat medium and water;
a hot water storage tank that stores water heated by the hot water supply heat exchanger;
a heating heat exchanger that heats an inside of a room using the heat medium;
a heat medium pump that feeds the heat medium;
a circulation pipe that annularly connects a discharge side of the heat medium pump, the heating means, the hot water supply heat exchanger, the heating heat exchanger, and a suction side of the heat medium pump in order;
a first bypass pipe that bypasses the hot water supply heat exchanger from the circulation pipe;
a second bypass pipe that bypasses the heating heat exchanger from the circulation pipe;
first flow regulating means that is provided at a junction between the circulation pipe and the first bypass pipe, and regulates a ratio between a flow rate of the heat medium flowing into the hot water supply heat exchanger and a flow rate of the heat medium flowing into the first bypass pipe;
a second flow regulating means that is provided at a junction between the circulation pipe and the second bypass pipe, and regulates a ratio between a flow rate of the heat medium flowing into the heating heat exchanger and a flow rate of the heat medium flowing into the second bypass pipe; and
control means for controlling the first flow regulating means and the second flow regulating means in accordance with degrees of a hot water supply request for heat exchange by the hot water supply heat exchanger and a heating request for heat exchange by the heating heat exchanger.

According to the present invention, a hot water supply request for heat exchange by a hot water supply heat exchanger and a heating request for heat exchange by a heating heat exchanger can be simultaneously achieved.

DETAILED DESCRIPTION OF THE PREFERRED EMBODIMENTS

Figure 1:
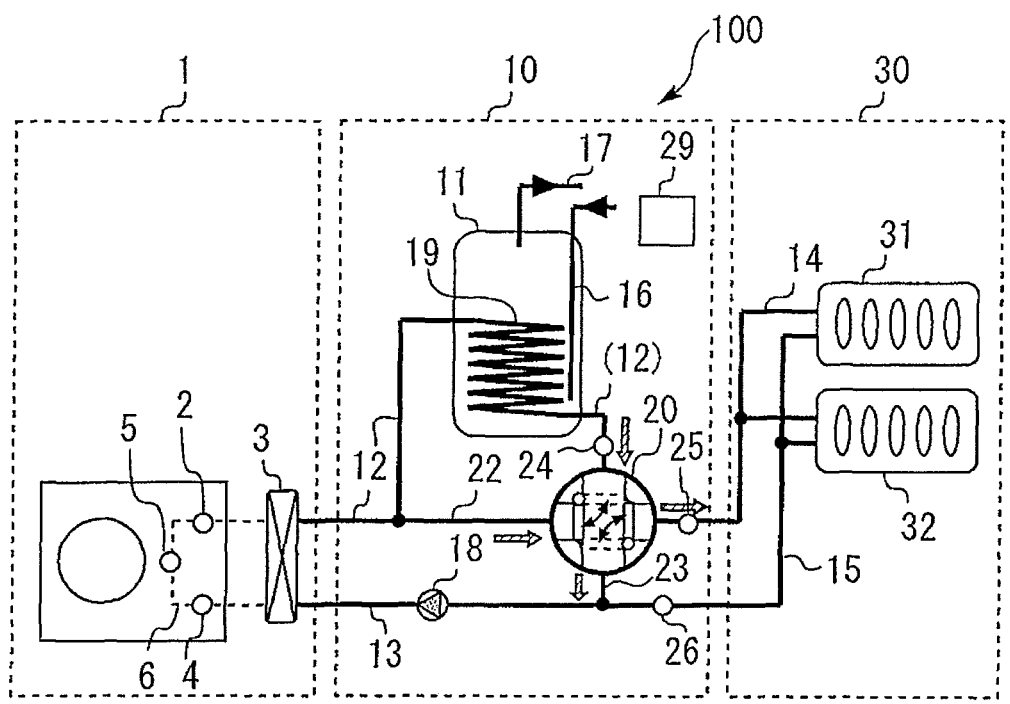
FIG. 1 is a circuit diagram of a heating and hot water supply system according to a first embodiment of the present invention.

Now, with reference to the drawings, embodiments of the present invention will be described. In the drawings, like components are denoted by like reference numerals, and overlapping descriptions will be omitted.

First Embodiment

Configuration of First Embodiment

FIG. 1 is a circuit diagram of a heating and hot water supply system 100 according to a first embodiment of the present invention. The heating and hot water supply system 100 in FIG. 1 includes a heat pump unit 1 including a refrigerant circuit of a vapor compression refrigeration cycle (heat pump cycle), a hot water storage tank unit 10 including a heating circulation circuit that heats water in a hot water storage tank 11, and a heating unit 30 that is constituted by a part of the heating circulation circuit and heats an inside of a room.

The heat pump unit 1 and the hot water storage tank unit 10 are connected by heat medium pipes 12, 13. The hot water storage tank unit 10 and the heating unit 30 are connected by heat medium pipes 14, 15. The hot water storage tank unit 10 is connected to a hot water supply pipe 17 connecting to a hot water supply terminal (for example, a faucet of a kitchen or bathroom sink), and a water supply pipe 16 for supplying water from a water source such as a water tap.

The heat pump unit 1 includes a refrigerant circuit in which a compressor 2, a refrigerant-water heat exchanger (condenser) 3, an expansion valve 4, and an evaporator 5 are annularly connected by a refrigerant pipe 6. The compressor 2 sucks and compresses a refrigerant into a high temperature and high pressure state. The refrigerant-water heat exchanger 3 performs heat exchange between a heat medium (for example, water) and a refrigerant to heat the heat medium and cool the refrigerant. The refrigerant-water heat exchanger 3 is constituted by, for example, a plate heat exchanger. The expansion valve 4 decompresses the refrigerant into a low temperature and low pressure state. The evaporator 5 performs heat exchange between outside air and the refrigerant to absorb heat from the outside air and heat the refrigerant. The refrigerant used in the refrigerant circuit of the heat pump unit 1 is not particularly limited, but may be, for example, a natural refrigerant such as R410A, R32, HFO-1234yf, hydrocarbon, or carbon dioxide. In this embodiment, a case where water is used as the heat medium for the circulation circuit will be described, but a usable heat medium is not particularly limited. Various liquids (for example, ethylene glycol, propylene glycol, or a mixture thereof) may be used within regulations of countries using this system.

Figure 2:
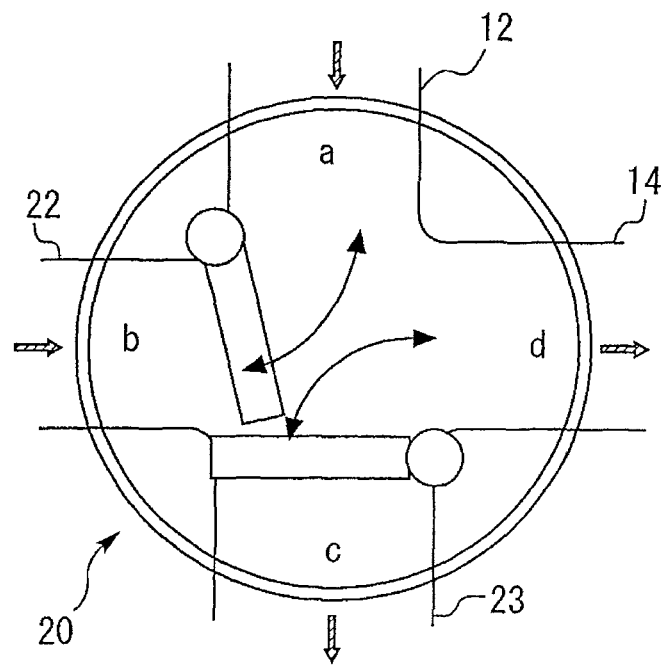
FIG. 2 illustrates an internal structure of the four-way valve used in the heating and hot water supply system according to this embodiment.

The hot water storage tank unit 10 includes the hot water storage tank 11, the heat medium pipes 12, 13, 14, 15, the hot water supply pipe 17, and the water supply pipe 16 described above, and also includes a heat medium pump 18, a hot water supply heat exchanger 19, a four-way valve 20, bypass pipes 22, 23, a temperature sensor 24, a control unit 29, or the like. FIG. 2 illustrates an internal structure of the four-way valve 20 used in the heating and hot water supply system 100 according to this embodiment. Now, with reference to FIGS. 1 and 2, a configuration of the heating and hot water supply system according to this embodiment will be described in more detail.

The four-way valve 20 functions as means for regulating flow distribution of the heat medium. Specifically, the four-way valve 20 includes two inlets a, b and two outlets c, d. The four-way valve 20 functions as first flow regulating means for regulating a ratio between a flow rate of the inlet a and a flow rate of the inlet b. The four-way valve 20 also functions as second flow regulating means for regulating a ratio between a flow rate of the outlet c and a flow rate of the outlet d. The control unit 29 functions as control means for controlling the four-way valve. The control unit 29 is programmed to regulate flow rates of the inlets a, b and the outlets c, d respectively in accordance with a heating request and a hot water supply request described later. The heat medium pipe 12 connects a discharge side of the heat medium of the refrigerant-water heat exchanger 3 and the inlet a of the four-way valve 20. The hot water supply heat exchanger 19 is provided in the middle of the heat medium pipe 12. The hot water supply heat exchanger 19 performs heat exchange between the heat medium and water in the hot water storage tank 11 to heat the water and cool the heat medium. The temperature sensor 24 detects a temperature of the heat medium discharged from the hot water supply heat exchanger 19.

The heat medium pipe 13 connects a suction side of the heat medium of the refrigerant-water heat exchanger 3 and one end of the heat medium pipe 15. The heat medium pump 18 is provided in the middle of the heat medium pipe 13. The heat medium pump 18 has a function of feeding the heat medium in the heat medium pipe 13 into the refrigerant-water heat exchanger 3. The heat medium pipe 14 connects the outlet d of the four-way valve 20 and inlet sides of heating heat exchangers 31, 32 described later. Further, outlet sides of the heating heat exchangers 31, 32 are connected to the other end of the heat medium pipe 15. A temperature sensor 25 detects a temperature of the heat medium having flowed out of the outlet d. A temperature sensor 26 detects a temperature of the heat medium having flowed out of the heating heat exchangers 31, 32.

The bypass pipe 22 connects a portion between the refrigerant-water heat exchanger 3 and the hot water supply heat exchanger 19 in the heat medium pipe 12 and the inlet b of the four-way valve 20. The bypass pipe 23 connects a connecting portion between the heat medium pipe 13 and the heat medium pipe 15 and the outlet c of the four-way valve 20.

The heating unit 30 includes the heating heat exchangers 31, 32 as hot water supply terminals. The heat medium is passed through the heating heat exchangers 31, 32 to heat air in a room. In this embodiment, two hot water supply terminals are provided, but one or three or more hot water supply terminals may be provided. The heating heat exchangers 31, 32 may include heating heat exchangers such as, for example, a radiator, a fan coil unit, or a floor heating heater.

Operation of First Embodiment

The heating and hot water supply system 100 controls instruments included in the heat pump unit 1, the hot water storage tank unit 10, and the heating unit 30 in accordance with a heating request that is requested to the heating unit 30 (specifically, a request for heat exchange by the heating heat exchangers 31,32) and a hot water supply request that is requested to the hot water storage tank unit 10 (specifically, a request for heat exchange by the hot water supply heat exchanger 19) to perform a heating operation mode, a hot water supply operation mode, and a heating and hot water supply operation mode. Now, operations in the respective operation modes will be described in detail.

(Hot Water Supply Operation Mode)

Figure 3:
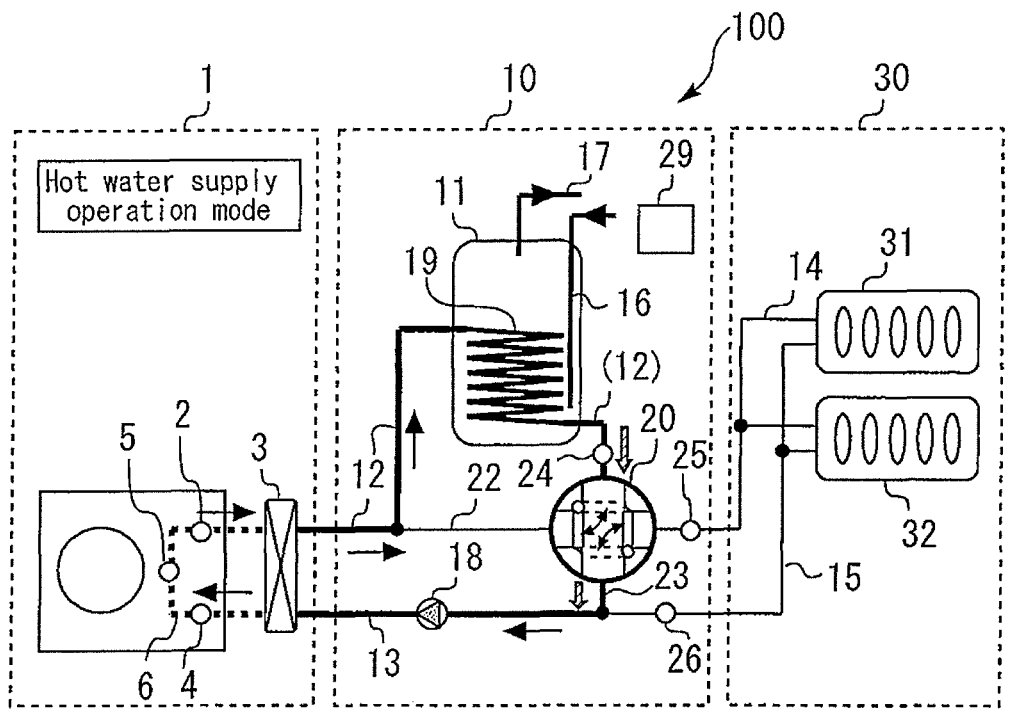
FIG. 3 illustrates a circulation circuit of the heat medium in the hot water supply operation mode.

First, with reference to FIG. 3, the hot water supply operation mode will be described. FIG. 3 illustrates a circulation circuit of the heat medium in the hot water supply operation mode. Arrows in FIG. 3 show flow directions of the refrigerant and the heat medium. When the hot water supply request is made without the heating request being made, an operation in the hot water supply operation mode is performed. In the hot water supply operation mode, as shown in FIG. 3, the four-way valve 20 is regulated to provide communication between the inlet a and the outlet c. Thus, a circulation circuit of the heat medium is formed in which the heat medium pump 18, the refrigerant-water heat exchanger 3, the hot water supply heat exchanger 19, and the four-way valve 20 are annularly connected by the heat medium pipe 13, the heat medium pipe 12, and the bypass pipe 23. In this state, the heat pump unit 1 and the hot water storage tank unit 10 are operated. Then, in the formed circulation circuit, the heat medium fed by the heat medium pump 18 flows out of the hot water storage tank unit 10, and flows through the heat medium pipe 13 into the heat pump unit 1. After the heat medium flows into the heat pump unit 1, the heat medium is heated by the refrigerant in the refrigerant-water heat exchanger 3 to a high temperature. The heat medium at high temperature flows out of the heat pump unit 1, and flows through the heat medium pipe 12 and again into the hot water storage tank unit 10. Then, the heat medium flows into the hot water supply heat exchanger 19 and is subjected to heat exchange with water, thereby heating the water in the hot water storage tank 11 and reducing the temperature of the heat medium. Then, the heat medium reduced in temperature again flows into the heat medium pump 18. Thus, the water in the hot water storage tank 11 is effectively heated by the heat medium.

(Heating Operation Mode)

Figure 4:
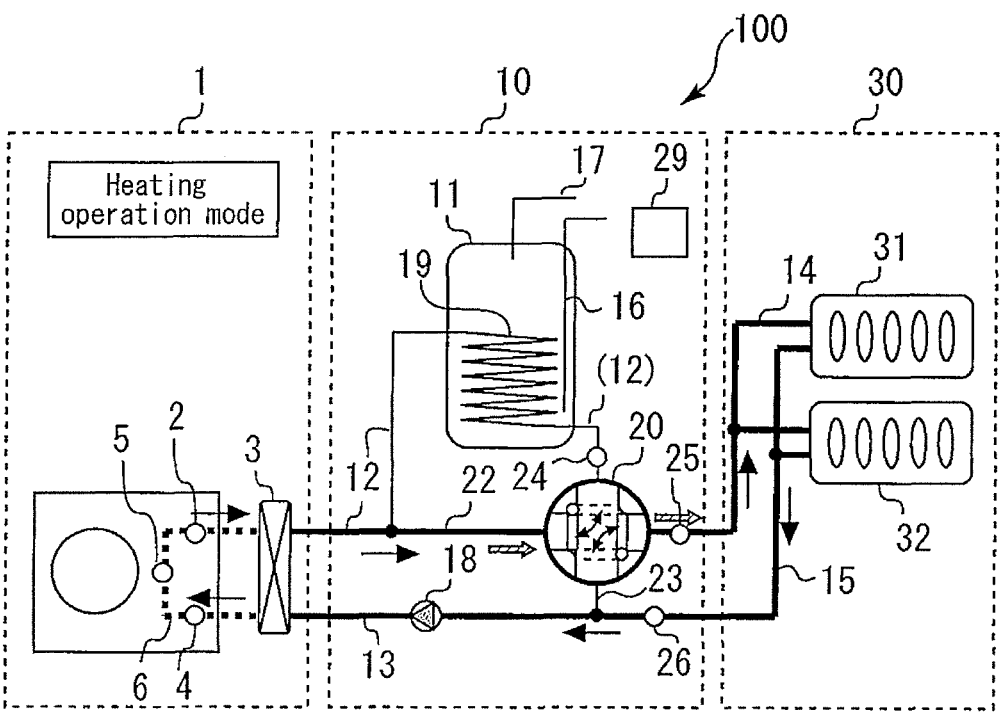
FIG. 4 illustrates a circulation circuit of the heat medium in the heating operation mode.

Next, with reference to FIG. 4, the heating operation mode will be described. FIG. 4 illustrates a circulation circuit of the heat medium in the heating operation mode. Arrows in FIG. 4 show flow directions of the refrigerant and the heat medium. When the heating request is made without the hot water supply request being made, an operation in the heating operation mode is performed. In the heating operation mode, as shown in FIG. 4, the four-way valve 20 is regulated to provide communication between the inlet b and the outlet d. Thus, a circulation circuit of the heat medium is formed in which the heat medium pump 18, the refrigerant-water heat exchanger 3, the four-way valve 20, and the heating heat exchangers 31, 32 are annularly connected by the heat medium pipe 13, the heat medium pipe 12, the bypass pipe 22, the heat medium pipe 14, and the heat medium pipe 15. In this state, the heat pump unit 1 and the heating unit 30 are operated. Then, in the formed circulation circuit, the heat medium fed by the heat medium pump 18 flows out of the hot water storage tank unit 10, and flows through the heat medium pipe 13 into the heat pump unit 1. After the heat medium flows into the heat pump unit 1, the heat medium is heated by the refrigerant in the refrigerant-water heat exchanger 3 to a high temperature. The heat medium at high temperature flows out of the heat pump unit 1, and flows through the heat medium pipe 12 and again into the hot water storage tank unit 10. Then, the heat medium flows via the four-way valve 20 out of the hot water storage tank unit 10, and flows through the heat medium pipe 14 into the heating unit 30. The heating heat exchangers 31, 32 perform heat exchange between the heat medium and indoor air to heat the inside of the room and reduce the temperature of the heat medium. The heat medium reduced in temperature flows out of the heating unit 30, flows through the heat medium pipe 15 into the hot water storage tank unit 10, and again flows into the heat medium pump 18. Thus, the inside of the room is effectively heated by the heat medium.

(Heating and Hot Water Supply Operation Mode)

Figure 5:
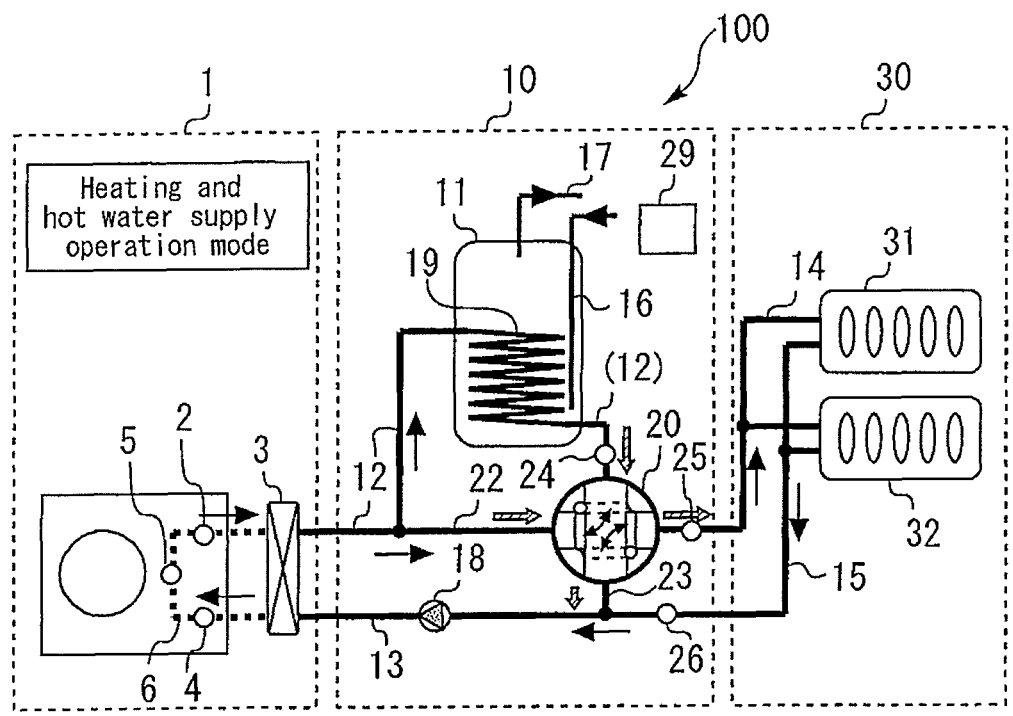
FIG. 5 illustrates a circulation circuit of the heat medium in the heating and hot water supply operation mode.

Further, with reference to FIG. 5, the heating and hot water supply operation mode will be described. FIG. 5 illustrates a circulation circuit of the heat medium in the heating and hot water supply operation mode. Arrows in FIG. 5 show flow directions of the refrigerant and the heat medium. When both the heating request and the hot water supply request are made, an operation in the heating and hot water supply operation mode is performed. In the heating and hot water supply operation mode, as shown in FIG. 5, the four-way valve 20 regulates flow distribution through the inlet a and the inlet b, and regulates flow distribution through the outlet c and the outlet d. Thus, a circulation circuit of the heat medium is formed in which the heat medium pump 18, the refrigerant-water heat exchanger 3, the hot water supply heat exchanger 19, the four-way valve 20, and the heating heat exchangers 31, 32 are annularly connected by the heat medium pipe 13, the heat medium pipe 12, the heat medium pipe 14, and the heat medium pipe 15. Also, a passage is formed in which a part of the heat medium bypasses the hot water supply heat exchanger 19 and the heating heat exchangers 31, 32 through the bypass pipes 22, 23, respectively.

In the heating and hot water supply operation mode, in this state, the heat pump unit 1, the hot water storage tank unit 10, and the heating unit 30 are operated. Thus, in the formed circulation circuit, the heat medium fed by the heat medium pump 18 flows out of the hot water storage tank unit 10, and flows through the heat medium pipe 13 into the heat pump unit 1. After the heat medium flows into the heat pump unit 1, the heat medium is heated by the refrigerant in the refrigerant-water heat exchanger 3 to a high temperature. The heat medium at high temperature flows out of the heat pump unit 1, and flows through the heat medium pipe 12 again into the hot water storage tank unit 10. Then, a part of the heat medium flows into the hot water supply heat exchanger 19 and is subjected to heat exchange with water, thereby heating the water in the hot water storage tank 11 and reducing the temperature of the heat medium. Thus, the water in the hot water storage tank 11 is effectively heated by the heat medium.

The heat medium having flowed out of the hot water supply heat exchanger 19 then joins the remaining heat medium having flowed through the bypass pipe 22 in the four-way valve 20. A part of the heat medium flows out of the hot water storage tank unit 10, and flows through the heat medium pipe 14 into the heating unit 30. The heating heat exchangers 31, 32 perform heat exchange between the heat medium and the indoor air, thereby heating the inside of the room and further reducing the temperature of the heat medium. The heat medium reduced in temperature flows out of the heating unit 30, flows through the heat medium pipe 15 into the hot water storage tank unit 10, joins the heat medium having passed through the bypass pipe 23, and again flows into the heat medium pump 18. Thus, the inside of the room is effectively heated by the heat medium.

Flow distribution regulation on an inflow side of the four-way valve 20 is controlled depending on request heating capability. Specifically, when the heating heat exchangers 31, 32 require large capability, an opening degree of the four-way valve 20 is regulated so that inflow distribution of the heat medium through the inlet b is larger. Specifically, a temperature (inflow temperature) of the heat medium flowing out through the outlet d and flowing into the heating heat exchangers 31, 32 is detected by the temperature sensor 25, and flow distribution on the inflow side of the four-way valve 20 is regulated so that the inflow temperature is a target temperature (inflow temperature target value) set depending on the request heating capability. This increases inflow distribution of the heat medium at high temperature from which heat is not dissipated by the hot water supply heat exchanger 19, into the heating heat exchangers 31, 32. On the other hand, when the heating heat exchangers 31, 32 require small capability, the opening degree of the four-way valve 20 is regulated so that inflow distribution of the heat medium through the inlet a is larger. This increases inflow distribution of the heat medium at middle temperature from which heat is dissipated by the hot water supply heat exchanger 19, into the heating heat exchangers 31, 32. The request heating capability can be set so that, for example, in comparison between room temperature and a target room temperature, lower room temperature than the target room temperature provides larger capability.

Flow distribution regulation on an outflow side of the four-way valve 20 is controlled depending on request heating capability and inflow capability of the four-way valve 20. Specifically, when the heating capability of the heat medium having flowed out through the outlet d of the four-way valve 20 is larger than the request heating capability, the opening degree of the four-way valve 20 is regulated so that inflow distribution of the heat medium flowing out through the outlet c is larger. Specifically, a temperature (outflow temperature) of the heat medium having flowed out of the heating heat exchangers 31, 32 is detected by the temperature sensor 26, and flow distribution on the outflow side of the four-way valve 20 is regulated so that the outflow temperature is a target temperature (outflow temperature target value) set depending on the request heating capability. Thus, the amount of the heat medium flowing into the heating heat exchangers 31, 32 is limited to an amount suitable for the request heating capability.

The flow regulation on the inlet side and the outlet side of the four-way valve 20 is performed as described above to allow control of the temperature and flow rate of the heat medium fed via the four-way valve 20 from the heat medium pipe 14, that is, heating capability, depending on the request heating capability for the target room temperature. This allows simultaneous operation of hot water supply and heating without reducing comfort in the room.

As described above, in the heating and hot water supply system 100 according to this embodiment, the four-way valve 20 can be controlled to configure the circulation circuit in which the heat medium circulates in the hot water supply heat exchanger 19 and the heating heat exchangers 31, 32. Thus, even if the heating request and the hot water supply request are simultaneously made, the heating operation is performed while the hot water supply operation being performed, thereby minimizing a reduction in room temperature. In the heating and hot water supply system 100 according to this embodiment, in addition to the heating and hot water supply mode, the heating operation mode or the hot water supply operation mode as in a conventional technique can be also achieved without any trouble by controlling the four-way valve 20.

In the above described embodiment, the four-way valve 20 is used to regulate flow distribution of the two inlets a, b and the two outlets C, d, but two three-way valves may be used instead of the four-way valve 20. Specifically, a first three-way valve that regulates flow distribution of the heat medium flowing in through two inlets a, b and leads the heat medium out of one outlet, and a second three-way valve that regulates flow distribution of the heat medium flowing in from the first three-way valve and leads the heat medium out of two outlets c, d may be provided instead of the four-way valve 20. Thus, the same operation as in using the four-way valve 20 can be performed using the two three-way valves.

In the above described embodiment, the flow distribution on the inflow side of the four-way valve 20 is regulated so that the inflow temperature detected by the temperature sensor 25 is the inflow temperature target value. However, the method for regulating the flow distribution on the inflow side of the four-way valve 20 is not limited to this. Specifically, as long as the flow distribution on the inflow side of the four-way valve 20 is regulated depending on the request heating capability, the flow distribution on the inflow side of the four-way valve 20 may be regulated in further consideration of the temperature of the heat medium having flowed out of the hot water supply heat exchanger 19 detected by the temperature sensor 24, or the outflow temperature detected by the temperature sensor 26.

In the above described embodiment, the flow distribution on the outflow side of the four-way valve 20 is regulated so that the outflow temperature detected by the temperature sensor 26 is the outflow temperature target value set depending on the request heating capability. However, the method for regulating the flow distribution on the outflow side of the four-way valve 20 is not limited to this. Specifically, as long as the flow distribution on the outflow side of the four-way valve 20 is regulated depending on the request heating capability, the flow distribution of the heat medium flowing out through the outlet c of the four-way valve 20 may be reduced when the temperature of the heat medium having flowed out of the hot water supply heat exchanger 19 detected by the temperature sensor 24 is extremely higher than the room temperature.

Second Embodiment

Configuration of Second Embodiment

Figure 6:
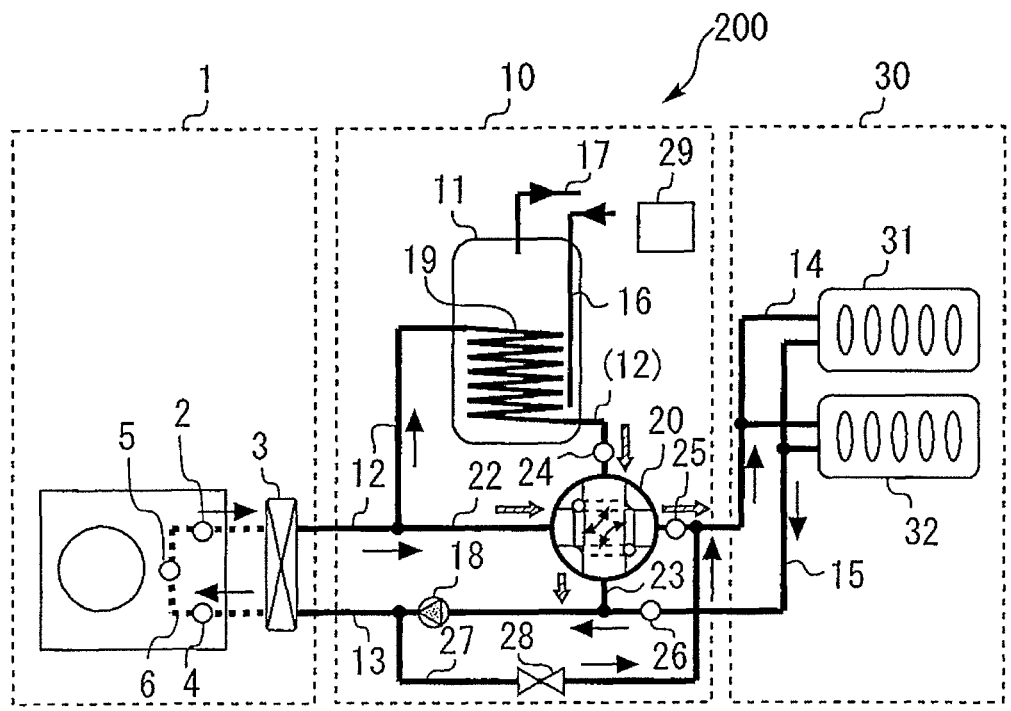
FIG. 6 is a circuit diagram of a heating and hot water supply system according to a second embodiment of the present invention.

FIG. 6 is a circuit diagram of a heating and hot water supply system 200 according to a second embodiment of the present invention. The heating and hot water supply system 200 in FIG. 6 includes, in addition to the configuration of the heating and hot water supply system 100 in FIG. 1, a heat medium pipe 27 that connects a discharge side of the heat medium pump 18 in the heat medium pipe 13 and the heat medium pipe 14. In the middle of the heat medium pipe 27, a flow regulating valve 28 is provided for regulating a flow rate of a heat medium flowing through the heat medium pipe 27 and functions as third flow regulating means. A desirable flow regulating valve 28 is, for example, a glove valve or a butterfly valve that can finely regulate a flow rate.

Operation of Second Embodiment

The heating and hot water supply system 200 controls instruments included in the heat pump unit 1, the hot water storage tank unit 10, and the heating unit 30 in accordance with a heating request that is requested to the heating unit 30 (specifically, a request for heat exchange by the heating heat exchangers 31, 32) and a hot water supply request that is requested to the hot water storage tank unit 10 (specifically, a request for heat exchange by the hot water supply heat exchanger 19) to perform a heating operation mode, a hot water supply operation mode, or a heating and hot water supply operation mode. Now, operations in the respective operation modes will be described in detail.
(Hot Water Supply Operation Mode)

In the hot water supply operation mode, the same operation as that of the heating and hot water supply system 100 according to the first embodiment is performed with the flow regulating valve 28 being fully closed. Specifically, in the hot water supply operation mode, the heat medium does not flow through the heat medium pipe 27.
(Heating Operation Mode)

In the heating operation mode, the same operation as that of the heating and hot water supply system 100 according to the first embodiment is performed with the flow regulating valve 28 being fully closed. Specifically, in the heating operation mode, the heat medium does not flow through the heat medium pipe 27.

(Heating and Hot Water Supply Operation Mode)

In the heating and hot water supply operation mode, in addition to the operation of the heating and hot water supply system 100 according to the first embodiment, the flow regulating valve 28 regulates the flow rate of the heat medium flowing through the heat medium pipe 27. More specifically, when the four-way valve 20 regulates flow distribution of the outlet d to be small, a reduction in flow to the heating heat exchangers 31, 32 may reduce heat exchange efficiency or cause uneven heating temperature. Thus, to reduce such problems, in the heating and hot water supply system 200 according to this embodiment, the flow regulating valve 28 is regulated to again introduce a part of the heat medium at low temperature after heat exchange by the heating heat exchangers 31, 32 through the heat medium pipe 27 to an upstream side of the heating heat exchangers 31, 32. Thus, even if flow distribution regulation on the outflow side of the four-way valve 20 limits the amount of the heat medium flowing into the heating heat exchangers 31,32, a certain flow rate can be ensured, thereby eliminating the above described problems.

The flow regulating valve 28 may be opened to a predetermined opening degree when the flow distribution on the outflow side of the four-way valve 20 is the flow distribution that causes the above described problems, or may be linearly regulated depending on the flow distribution.

DESCRIPTION OF REFERENCE CHARACTERS

1: heat pump unit
3: refrigerant-water heat exchanger (heating means)
10: hot water storage tank unit
11: hot water storage tank
12, 13, 14, 15: heat medium pipes (circulation pipe)
18: heat medium pump
19: hot water supply heat exchanger
20: four-way valve (first flow regulating means, second flow regulating means)
22: bypass pipe (first bypass pipe)
23: bypass pipe (second bypass pipe)
24: temperature sensor
25: temperature sensor (inflow temperature detection means)
26: temperature sensor (outflow temperature detection means)
27: heat medium pipe (third bypass pipe)
28: flow regulating valve (third flow regulating means)
29: control unit (control means)
30: heating unit
31, 32: heating heat exchangers
100, 200 heating and hot water supply systems

The invention claimed is:

1. A heating and hot water supply system comprising:
a heater configured to heat a heat medium;
a hot water supply heat exchanger that performs heat exchange between the heat medium and water;
a hot water storage tank that stores water heated by the hot water supply heat exchanger;
a heating heat exchanger that heats an inside of a room using the heat medium;
a heat medium pump that feeds the heat medium;
a circulation pipe that annularly connects a discharge side of the heat medium pump, the heater, the hot water supply heat exchanger, the heating heat exchanger, and a suction side of the heat medium pump in order;
a first bypass pipe that bypasses the hot water supply heat exchanger from the circulation pipe;
a second bypass pipe that bypasses the heating heat exchanger from the circulation pipe;
a first flow regulator that is provided at a junction between the circulation pipe and the first bypass pipe, and is configured to regulate a first ratio between a flow rate of the heat medium flowing into the hot water supply heat exchanger and a flow rate of the heat medium flowing into the first bypass pipe, such that the first ratio may vary between more than two values between 0% and 100%;
a second flow regulator that is provided at a junction between the circulation pipe and the second bypass pipe, and is configured to regulate a second ratio between a flow rate of the heat medium flowing into the heating heat exchanger and a flow rate of the heat medium flowing into the second bypass pipe, such that the second ratio may vary between more than two values between 0% and 100%; and
a controller configured to control the first flow regulator and the second flow regulator in accordance with degrees of a hot water supply request for heat exchange by the hot water supply heat exchanger and a heating request for heat exchange by the heating heat exchanger, wherein
the circulation pipe conveys the heat medium from the discharge side of the heat medium pump, through the heater, through the hot water supply heat exchanger, through the heating heat exchanger, and to the suction side of the heat medium pump, and
the heating heat exchanger performs heat exchange between the heat medium provided along the circulation pump and indoor air to heat the inside of the room and reduce the temperature of the heat medium.

2. The heating and hot water supply system according to claim 1, further comprising
an inflow temperature detector for detecting an inflow temperature of the heat medium flowing into the heating heat exchanger,
wherein the controller controls the first flow regulator so that the inflow temperature is an inflow temperature target value determined by the heating request.

3. The heating and hot water supply system according to claim 1, further comprising
an outflow temperature detector for detecting an outflow temperature of the heat medium flowing out of the heating heat exchanger,
wherein the controller controls the second flow regulator so that the outflow temperature is an outflow temperature target value determined by the heating request.

4. The heating and hot water supply system according to claim 1, further comprising:
a third bypass pipe that connects a portion between the second flow regulator and the heating heat exchanger in the circulation pipe and a discharge side of the heat medium pump in the circulation pipe;
a third flow regulator provided in a middle of the third bypass pipe; and
a second controller configured to regulate an opening degree of the third flow regulator in accordance with a ratio regulated by the second flow regulator.

5. The heating and hot water supply system according to claim 1, wherein the heater is a refrigerant-water heat exchanger.

* * * * *